Feb. 12, 1924.
F. TONGE
LID HOLDER
Filed May 1, 1923
1,483,255
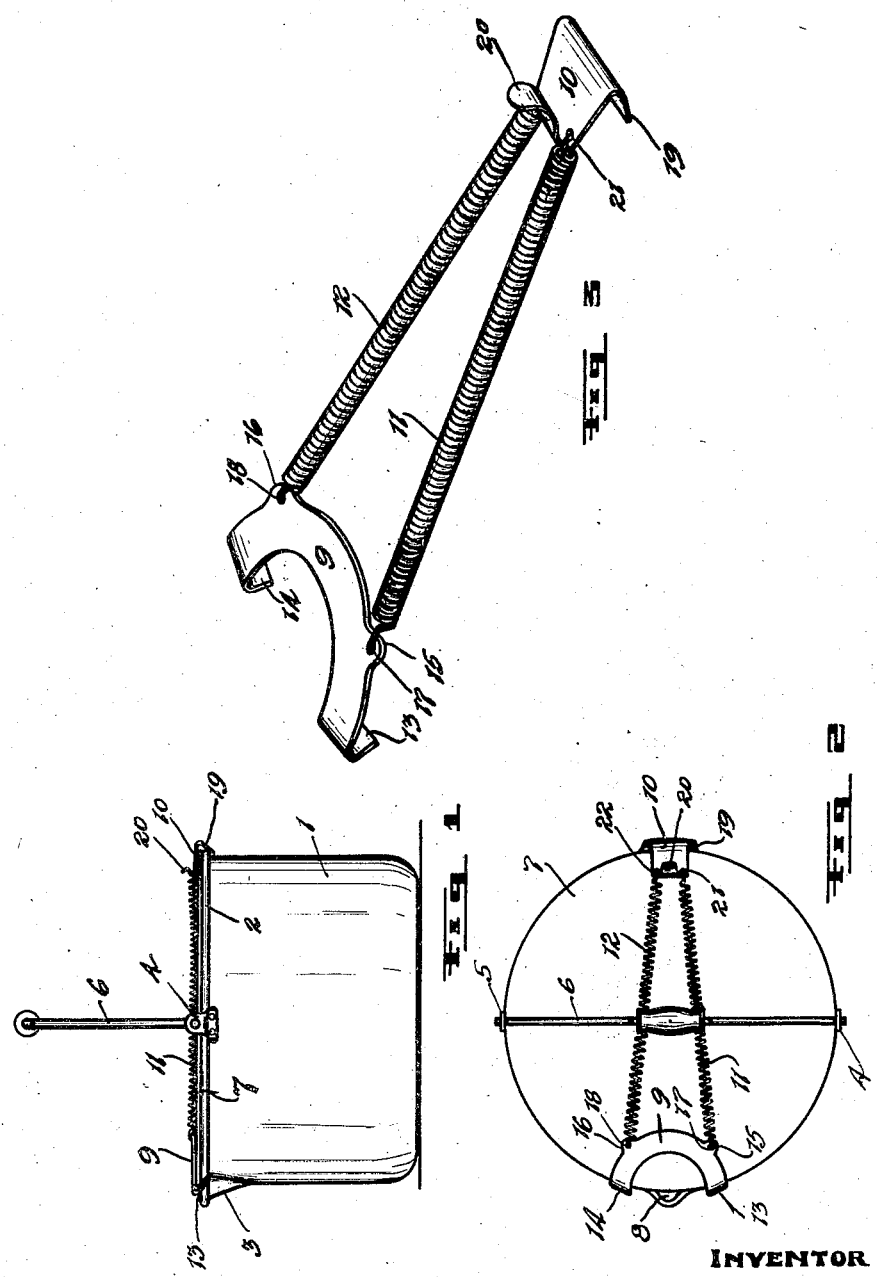
INVENTOR
F. Tonge
By Patented Feb. 12, 1924.

1,483,255

UNITED STATES PATENT OFFICE.

FRANK TONGE, OF MOOSE JAW, SASKATCHEWAN, CANADA.

LID HOLDER.

Application filed May 1, 1923. Serial No. 635,914.

*To all whom it may concern:*

Be it known that I, FRANK TONGE, a subject of the King of Great Britain, and a resident of the city of Moose Jaw, in the Province of Saskatchewan, Canada, have invented certain new and useful Improvements in Lid Holders, of which the following is the specification.

The invention relates to improvements in lid holders and an object of the invention is to provide a holder for retaining the lid on a pot, thereby facilitating the work of draining the pot and also avoiding any possibility of the operator being scalded.

A further object is to construct the appliance in a cheap and durable manner and so that it can be quickly attached to the pot to hold the lid thereon or removed therefrom.

A further object is to construct the appliance so that it will readily adapt itself to pots of varying diameter.

With the above more important objects in view the invention consists essentially in the arrangement and construction of parts hereinafter more particularly described and later pointed out in the appended claims, reference being had to the accompanying drawing in which:—

Fig. 1 is a side view of the holder applied on the pot and holding the lid thereon.

Fig. 2 is a plan view of the parts appearing in Figure 1.

Fig. 3 is a perspective view of the clip.

In the drawing like characters of reference indicate corresponding parts in the several figures.

Difficulty is at the present time experienced in draining hot water from a pot where no provision is made for holding the lid in place and the operator is very apt to get scalded in doing the work.

The holder which I have provided avoids this difficulty and is constructed and used in the manner shortly described.

The pot 1 is of the usual type, being provided with the customary rolled or reinforced upper end 2, the pouring lip 3 and the opposing ears 4 and 5 to which the customary handle 6 is attached. The lid 7 is applied on the upper end of the pot in the usual manner and closes the same with the exception of the pouring outlet 8 at the lip. The lid is held in place on the pot by my holder which comprises a two armed clip 9 and a single armed clip 10, the clips being connected by similar diverging coil springs 11 and 12. The clip 9 is made from a piece of stiff metal stamped in a U-shaped form and having the ends thereof downturned to provide hooks or catches 13 and 14. Lugs 15 and 16 are also provided, these being fitted with eyes 17 and 18 so that the springs can be readily attached thereto.

The clip 10 has one end downturned to provide a single comparatively wide catch or hook 19 and the other end upturned in an ogee shape to provide a finger grip or lever 20. The lever is narrower than the clip and the ends of the springs are connected to the body of the clip at the sides of the lever, suitable openings 21 and 22 being provided in the clip to receive the ends of the springs.

The holder is designed so that the springs require to be extended somewhat to apply the holder on the pot. When the holder is to be attached to the pot to hold the lid in place the catches 13 and 14 are caught over the reinforced or rolled edge of the pot and the forward edge of the lid and preferably take a position at opposite sides of the lip 3. After having so caught the catches 13 and 14 one grasps the lever 20 in his fingers and extends the springs by pulling backwardly in order to enable him to pass the catch 19 over the rear edge of the lid and the rear side of the rolled edge of the pot. Once caught the holder will remain tightly in place on the pot and accordingly will positively prevent the lid from slipping off when one is draining the pot. It is a very easy matter to release the holder as one has only to draw back on the lever to extend the springs sufficiently to release the rear clip from the pot.

This holder will fit pots of varying diameter as the spring will extend for different sizes and the clips will catch the rolled edge, as an increased or decreased pot radius within a reasonable limit does not alter gripping effect of the catches.

What I claim as my invention is:

1. A pot holder comprising a substantially U-shaped flat metallic clip having the ends thereof terminating in downturned hook like catches and provided at opposite sides of the body part thereof with eyes, a further clip formed from a flat metallic plate having one end downturned to provide a hook like catch and the other end upturned to provide a finger grip and fitted at the sides adjoining the grip with eyes and diverging coil springs connecting the latter clip with the former, the springs being attached at the eyes.

2. Lid retaining means for cooking utensils comprising a substantially U-shaped metal plate terminating in hook-like extremities and provided with eyes disposed at opposite sides thereof, a further clip comprising a plate having one edge turned downwardly to afford a hook and apertured opposite the adjacent edge to provide a pair of spaced eyes and a pair of springs extending between and connecting said plates with the extremities of the springs secured in said eyes.

Signed at Moose Jaw this 27th day of January 1923.

FRANK TONGE.

In the presence of:—
 EM THOMSON,
 ALLAN R. RORISON.